H. LEMP.
CONTROLLING MEANS FOR ENGINE GENERATOR DRIVEN VEHICLES.
APPLICATION FILED JUNE 24, 1914.
1,216,237.   Patented Feb. 13, 1917.
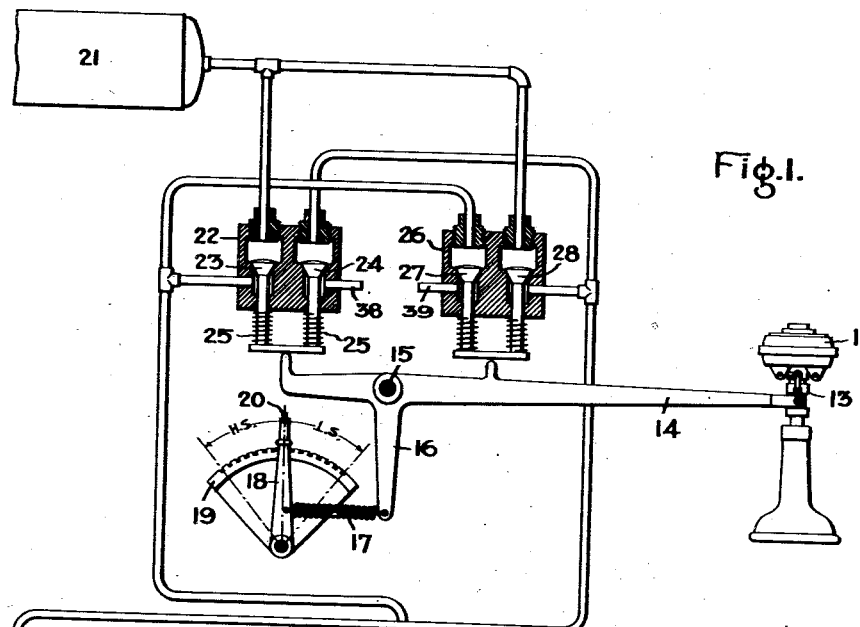
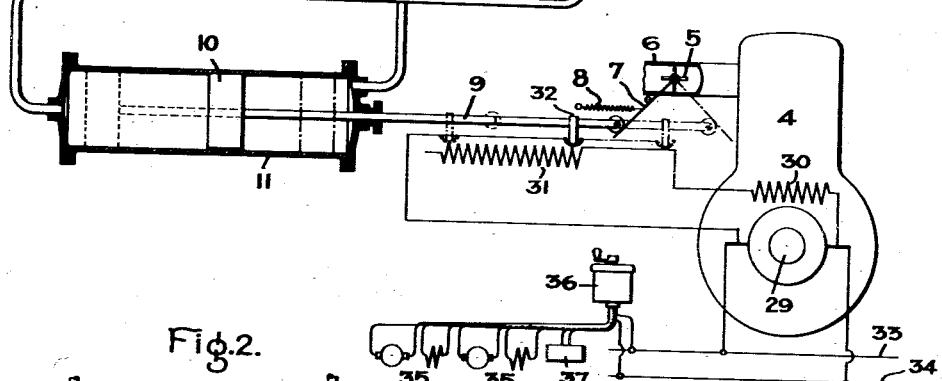
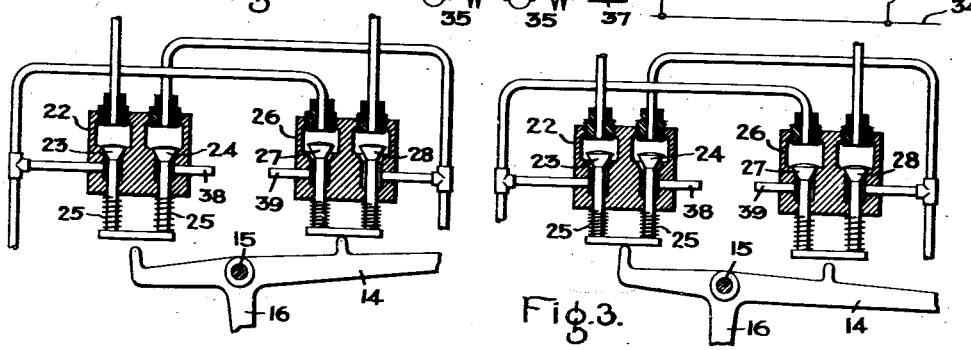
Witnesses:
Marcus L. Byng.
J. Ellis Glen.
Inventor:
Hermann Lemp,
by: Albert G. Davis
His Attorney.

UNITED STATES PATENT OFFICE.

HERMANN LEMP, OF ERIE, PENNSYLVANIA, ASSIGNOR TO GENERAL ELECTRIC COMPANY, A CORPORATION OF NEW YORK.

CONTROLLING MEANS FOR ENGINE-GENERATOR-DRIVEN VEHICLES.

1,216,237. Specification of Letters Patent. Patented Feb. 13, 1917.

Application filed June 24, 1914. Serial No. 847,135.

*To all whom it may concern:*

Be it known that I, HERMANN LEMP, a citizen of the United States, residing at Erie, county of Erie, State of Pennsylvania, have invented certain new and useful Improvements in Controlling Means for Engine-Generator-Driven Vehicles, of which the following is a specification.

There are in use at the present time self-propelled vehicles in which an internal combustion engine is arranged to drive an electric generator which in turn supplies current to one or more electric motors for driving the vehicle. These motors are commonly mounted on the trucks. The speed of the vehicle is controlled by varying the speed of the engine, by varying the strength of the field of the generator and by connecting the motors in series or parallel and varying the resistance in series therewith. The engine is controlled by a hand actuated throttle valve. Changes in the strength of the generator field and changes in the motor circuits are obtained by a drum controller which has an operating handle. As regards the latter changes they must take place in an invariable manner. Assuming that it be desired to propel the vehicle at say 40 miles per hour it can be accomplished by moving the throttle valve lever to one position and the controller handle to another position. These positions of the throttle valve and controller handle produce, as a net result, the desired speed of the vehicle. This may mean for example that the engine is running very rapidly; that a certain amount of resistance has been cut out of the field circuit of the generator and that the motors are connected in parallel with or without resistance as the case may be. This same vehicle speed could, however, be produced by adjusting the throttle lever to a position admitting less fuel to the engine, thereby reducing its speed and adjusting the controller handle to a position where a different amount of resistance is included in the field circuit of the generator or a different relation of the motor circuits is produced, or both. To state the matter in another way, the same vehicle speed may be obtained by different settings of the controlling devices, one of which is more economical of fuel than the other. From this it follows that the economical or non-economical operation of the vehicle is left almost, if not entirely, to the operator whose judgment may or may not be good.

An analogy is found in the automobile art. The operator may utilize the high speed gear and throttle the supply of gasolene to the engine to give the desired speed of the vehicle; or he may utilize the intermediate or other gear and run the engine faster to obtain the same vehicle speed. For a given condition one arrangement is more economical than the other. Comparatively few operators, however, are able to drive a car under the most economical conditions all the time.

My invention has for its object to overcome the shortcomings or defects above outlined in prior constructions and to provide a governing mechanism by which the best relation of engine speed and generator conditions will be obtained for each and all speeds of the vehicle. A further object is to provide a governing mechanism for the purpose described in which the parts are so combined or associated that a single handle suffices to control the setting of all of them.

In the accompanying drawing is illustrated diagrammatically one of the embodiments of my invention in which Figure 1 is a view of the controlling mechanism for an internal combustion engine and electric generator; Fig. 2 is a detail view showing the pilot valve mechanism in one of its positions, and Fig. 3 is a detail view of the same illustrating another of its positions.

4 indicates an internal combustion engine which may be of any suitable character. It may use any suitable kind of fuel, such as gasolene, kerosene, or heavy oils for example. The admission of fuel to the engine is controlled by a regulator adapted to the needs of the particular engine employed. As illustrated it comprises a throttle valve 5 in the inlet pipe 6 leading to the engine cylinder or cylinders. On the spindle of the regulator is a lever 7 that is normally urged to the full open position by the spring 8. The lever is moved in the opposite direction by a rod 9 that is provided with a motor piston 10 located in its cylinder 11.

12 indicates a speed governor of any suitable type that is driven by the engine, and whose sliding collar 13 moves the governor lever 14 against the action of the usual weights or spring as the case may be. This governor should be so constructed and arranged as to hold the speed of the engine constant within a suitable range for each setting of the hand operated control lever. It should be capable of controlling the speed of the engine from the minimum of 200 R. P. M., for example, and all intermediate speeds up to the maximum of 550 R. P. M., for example. The governor may be on the engine proper, on the generator, or between the two. The principal thing is to have it responsive to speed changes of the engine. The governor lever 14 is pivoted at 15 and has two lugs on its upper side arranged to alternately engage the pilot valves, as will appear later. Extending below the lever is an arm 16 to which is attached the coiled extension spring 17. This spring in effect forms an auxiliary part of the governor by means of which its setting or operating range can be adjusted. The other end of the spring is attached to the hand lever 18 that moves over the notched quadrant 19, said lever having a spring pressed latch 20 for engaging the notches and holding the lever in place. As shown the lever is in a midposition. Moving it to the right will decrease the spring tension and cause the speed of the engine to decrease. Moving it to the left will increase the spring tension and cause the speed of the engine to increase. In other words, the speed operating range of the governor may be progressively shifted from point to point but for each setting of the governor spring 17, said governor will hold the speed substantially constant.

21 indicates a tank containing fluid under pressure, which may be water, oil, air, or other fluid. Since it is necessary to have air under pressure on the vehicle for other purposes, it will be found convenient to use air for actuating the parts. 22 indicates a chest containing valves 23 and 24, the stems of which are united by a yoke at the bottom and are normally held on their seats by springs 25. In the chest 26 are similarly constructed valves 27 and 28. The valves 23 and 27 control the passage of fluid to and from the right-hand end of the cylinder 11 and valves 28 and 24 the passage of fluid to and from the left-hand end of the cylinder.

Driven by the engine shaft is an electric generator 29 of any suitable construction. As here shown it is of the direct current shunt wound type having a field winding 30. In circuit with the winding is an adjustable resistance or regulator 31, and it is to be noted that it is no longer associated with the controller for the electric propelling motors as heretofore. Arranged to slide back and forth over the resistance in the regulator, to cut it into and out of circuit, is a contact 32 carried by the rod 9. This resistance may be taken as typical of any suitable regulator applicable for the purpose described. Current from the armature is delivered to the bus bars 33 and 34 which supply current to the motors 35. These motors are of the ordinary series wound type and may be connected in series or parallel for forward driving and reversing by the controller 36 which may be of any ordinary or well known type now in use on street cars. 37 indicates the usual resistance for the motors 35, and the amount of resistance in circuit is determined by the controller.

Assuming that it is desired to propel the vehicle at the rate of 40 miles per hour on the level the handle 18 is set to the position shown, which position will produce an engine speed to give the desired car speed. If the speed of the engine is too low to begin with the governor collar 13 will drop and depress the right-hand end of the lever 14 as in Fig. 3. This will open the valves 23 and 24 and fluid under pressure will flow from the tank 21 past the valve 23 into the right-hand end of the cylinder 11 causing the piston to move the rod 9 to the left. At the same time the opening of the valve 24 permits fluid to exhaust from the other end of the cylinder through the pipe 38. This movement of the rod 9 to the left will act to bring the speed of the engine to the desired value for which the governor is set. If the regulator 5 is not already fully open, the end of the rod 9 will move so as to permit the spring 8 to farther open it, thus admitting more fuel to the engine. After the regulator 5 is fully open, then the sliding contact 32 will act to increase the amount of resistance in the field circuit of the generator, thus weakening the generator field until the proper relation of field strength to armature speed is obtained. When the engine speed as determined by the tension of spring 17 and speed governor 12 is obtained, the sliding collar 13 will move the lever 14 and release the valves 23 and 24. If the engine speed is too high for the position of the hand lever 18 when it is adjusted by the operator, the governor will raise the lever 14, as shown in Fig. 2, and open valves 27 and 28. This will have the effect of admitting fluid pressure to the left-hand end of the cylinder 11 permitting it to exhaust from the right-hand end by the pipe 39.

Assuming a given position of the hand lever 18, if the speed of the engine increases or decreases with respect to that determined by said lever due to a change in load on the generator brought about by changes in the grade of the road bed or for any other reason, the speed governor will raise or lower the outer end of the lever 14 and cause it to actuate the pilot valves 23, 24 or 27, 28 as the case may be until the proper adjustment of the regulator 5 and of the field resistance 31 is obtained. From this it follows that all the operator has to do is to adjust the hand lever, the associated parts automatically moving to their proper positions. This, as will be seen, leaves nothing to the judgment of the operator except in changing the circuits of the motors which requires very little skill.

It is to be noted that the range of operation of the speed governor is variable due to the action of the spring 17 and lever 18 and that once said parts are set it operates like an ordinary governor to maintain a constant speed. When the engine for any reason exceeds the predetermined speed the governor causes the field of the generator to be gradually strengthened. After the field has reached its maximum strength, the supply of fuel to the engine will be throttled by governor action if it be necessary to further decrease its speed. When the engine speed is too low for any reason the supply of fuel to the engine is increased and subsequently the strength of the field is decreased by cutting in resistance, thus establishing the proper operating conditions. Inasmuch as variations in the supply of fuel to the engine and changes in field strength of the generator take place successively, and in the opposite sense, it follows that the engine will be quickly brought to its proper operating speed.

By reason of my improved construction, I am able to effect economies in fuel consumption, decrease the cost of depreciation because of more effective use, and to generally improve the service received from the vehicle. It will be noted that the operator cannot adjust the field rheostat independently of the speed of the engine as heretofore and that its action is wholly a function of the speed governor, and that the proper relation of parts will be set once for all. The operator has merely to adjust the handle 18 and the proper relation of parts is automatically established.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a system of the character described, the combination of an engine, an electric generator driven thereby, means for regulating the supply of fuel to the engine, a field resistance for the generator, and a common means for controlling both the regulating means and the resistance, said common means comprising a movable member which acts on said regulating means and resistance successively so that with increase in load the regulating means is first operated and then the field resistance is cut in.

2. In a system of the character described, the combination of an engine, an electric generator driven thereby, means for regulating the supply of fuel to the engine, a field resistance for the generator and a common means for controlling both the regulating means and the resistance, said common means comprising a movable member which acts on said regulating means and resistance successively so that with increase in load the regulating means is first operated and then the field resistance is cut in, and a speed governor for controlling the movements of said member.

3. In a system of the character described, the combination of an engine, an electric generator driven thereby, means for regulating the supply of fuel to the engine, a field resistance for the generator, and a common means for controlling both the regulating means and the resistance, said common means comprising a movable member which acts on said regulating means and resistance successively so that with increase in load the regulating means is first operated and then the field resistance is cut in, a speed governor for controlling the movement of said member, and means for changing the setting of the governor to obtain different and constant speeds of the engine.

4. In a system of the character described, the combination of an engine, a regulator therefor, an electric generator driven by the engine, a regulator therefor, means that acts on said regulators successively so that with increase in load the first named regulator is actuated prior to the second, a speed governor that controls the action of the means, an auxiliary spring for the governor, and a hand lever for changing the tension of the spring.

5. In a system for controlling a motor car wherein an engine drives a generator which in turn supplies current to the car motors, the combination with the engine, the generator, and the motor, of means for automatically controlling the engine and generator to maintain the engine at a constant predetermined speed, and two controllers, one of which regulates the motor connections, and the other of which regulates said means to set it for different engine speeds.

6. In a system for controlling a motor car wherein an engine drives a generator which in turn supplies current to the car motors, the combination with the engine, the generator, and the motor, of a regulator for the engine, a regulator for the generator, means which acts on said regulator successively so that with increase in load the first named regulator is actuated prior to the second, a speed governor which controls said means, a controller for changing the setting of the governor, and a second controller which regulates the motor connections.

7. In a system for controlling a motor car wherein an engine drives a generator which in turn supplies current to the car motors, the combination with the engine, the generator, and the motor, of means for regulating the supply of fuel to the engine, a field resistance for the generator, a common means for controlling both the regulating means and the resistance, said common means comprising a movable member which acts on said regulating means and resistance successively so that with increase in load the regulating means is first operated and then the field resistance is cut in, a controller for said common means, and a controller for regulating the motor connections.

8. In a system for controlling a motor car wherein an engine drives a generator which in turn supplies current to the car motors, the combination with the engine, the generator, and the motor, of a valve mechanism for regulating the supply of fuel to the engine, a field resistance device for the generator, a common means for actuating the valve mechanism and resistance device, said means acting on increase in load to first open the valve mechanism and then cut in resistance, a speed governor for controlling said common means, a controller for changing the setting of the governor, and a second controller for regulating the motor connections.

In witness whereof, I have hereunto set my hand this twenty-second day of June, 1914.

HERMANN LEMP.

Witnesses:
OTTO F. PERSSON,
O. T. FOUCHE.